US012059031B2

(12) United States Patent
Tsukamoto et al.

(10) Patent No.: US 12,059,031 B2
(45) Date of Patent: Aug. 13, 2024

(54) HOUSING AND FLAVOR ASPIRATOR PROVIDED WITH SAME

(71) Applicant: JAPAN TOBACCO INC., Tokyo (JP)

(72) Inventors: Kouji Tsukamoto, Tokyo (JP); Takeo Mitsui, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 606 days.

(21) Appl. No.: 17/236,878

(22) Filed: Apr. 21, 2021

(65) Prior Publication Data

US 2021/0235761 A1 Aug. 5, 2021

Related U.S. Application Data

(63) Continuation of application No. PCT/JP2018/039856, filed on Oct. 26, 2018.

(51) Int. Cl.
*A24F 40/46* (2020.01)
*A24F 40/20* (2020.01)
*H05B 3/42* (2006.01)

(52) U.S. Cl.
CPC .............. *A24F 40/46* (2020.01); *A24F 40/20* (2020.01); *H05B 3/42* (2013.01)

(58) Field of Classification Search
CPC ............ A24F 40/46; A24F 40/20; H05B 3/42
USPC .......................................................... 131/329
See application file for complete search history.

(56) References Cited

U.S. PATENT DOCUMENTS 6,570,086 B1 5/2003 Shimoji et al.
9,451,792 B1 9/2016 Alima
11,039,644 B2 * 6/2021 Paprocki ............... A24F 40/485
11,039,844 B2 6/2021 Paprocki et al.
2007/0074734 A1 4/2007 Braunshteyn et al.
2016/0255879 A1 9/2016 Paprocki et al.
2016/0345628 A1 12/2016 Sabet
2017/0295844 A1 10/2017 Thevenaz et al.
2019/0223505 A1 * 7/2019 Tang ....................... A24F 40/40
2019/0320719 A1 10/2019 Liu et al.
2020/0041354 A1 * 2/2020 Ide ......................... H05K 1/189
2021/0307398 A1 * 10/2021 Paprocki ................ A24F 40/46

FOREIGN PATENT DOCUMENTS

CA 2 244 210 C 6/1998
CN 105831812 A 8/2018
GB 2534213 A 7/2016
JP 2007-217206 A 8/2007
JP 5133891 B2 1/2013
JP 2013-189013 A 9/2013

(Continued)

OTHER PUBLICATIONS

Extended European Search Report for European Application No. 18938077.7, dated Oct. 7, 2022.

(Continued)

*Primary Examiner* — Gary F Paumen
(74) *Attorney, Agent, or Firm* — XSENSUS LLP

(57) ABSTRACT

A housing and a flavor inhalation device have a new structure. The housing includes a first housing capable of accommodating a heat generating element, a second housing enclosing the first housing, and a heat diffusion member provided in at least a part of space between the first housing and the second housing and having a higher heat conductivity than the first housing and the second housing.

16 Claims, 9 Drawing Sheets

(56) References Cited

FOREIGN PATENT DOCUMENTS

| | | | |
|---|---|---|---|
| JP | 2015-506170 | A | 3/2015 |
| JP | 2016-534730 | A | 11/2016 |
| JP | 2018-78231 | A | 5/2018 |
| KR | 10-2018-0085365 | A | 7/2018 |
| TW | 201824962 | A | 7/2018 |
| WO | WO 98/23171 | A1 | 6/1998 |
| WO | WO 01/95687 | A1 | 12/2001 |
| WO | WO 2013/098395 | A1 | 7/2013 |
| WO | WO 2018/041105 | A1 | 3/2018 |
| WO | WO 2018/135887 | A1 | 7/2018 |
| WO | WO 2018/186172 | A1 | 10/2018 |

OTHER PUBLICATIONS

Korean Office Action dated May 25, 2023 for Application No. 10-2021-7015316 with an English translation.
Japanese Office Action for Japanese Application No. 2020-552474, dated May 30, 2022, with English translation.
Partial Supplementary European Search Report for European Application No. 18938077.7, dated Apr. 29, 2022.
International Search Report for PCT/JP2018/039856 mailed on Jan. 29, 2019.
Russian Office Action and Search Report for Russian Application No. 2021114509, dated Oct. 22, 2021, with an English translation.
Japanese Office Action for Japanese Application No. 2023-045003, dated Apr. 3, 2023, with an English translation.

* cited by examiner

HOUSING AND FLAVOR ASPIRATOR PROVIDED WITH SAME

CROSS REFERENCE TO RELATED APPLICATIONS

The present application is a continuation application of International Application No. PCT/JP2018/039856, filed on Oct. 26, 2018, which is hereby expressly incorporated by reference into the present application.

TECHNICAL FIELD

The invention relates to housings and flavor inhalation devices provided with the same.

BACKGROUND ART

Flavor inhalation devices for inhaling flavors without burning material have conventionally been known. Known as such flavor inhalation devices include, for example, a smokeless cigarette system using an igniter that includes an insulating jacket that substantially encloses a roughly cylindrical heating device, has an outer surface, and is made of insulating material. The insulating jacket has the thickness selected to keep the temperature of the outer surface less than 40° C. (see Patent Literature 1).

CITATION LIST

Patent Literature

PTL 1: Japanese Patent No. 5133891

SUMMARY OF INVENTION

Technical Problem

An object of the invention is to provide a housing and a flavor inhalation device which have a new structure.

Solution to Problem

One embodiment of the invention provides a housing. The housing comprises a first housing capable of accommodating a heat generating element, a second housing enclosing the first housing, and a heat diffusion member provided in at least a part of space between the first housing and the second housing and having a higher heat conductivity than the first and second housings.

Another embodiment of the invention provides a flavor inhalation device provided with the aforementioned housing.

DESCRIPTION OF EMBODIMENTS

Embodiments of the invention will be discussed with reference to the attached drawings. Regarding the drawings discussed below, the same or equivalent constituent elements will be provided with the same reference marks, and overlapping discussion will be omitted.

Figure 1A:
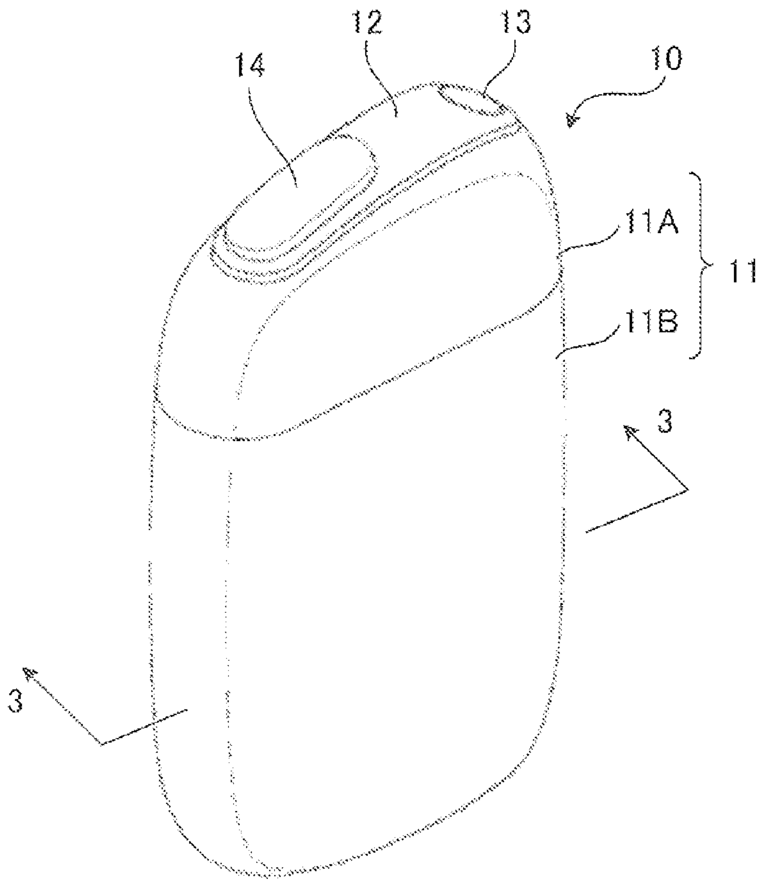
FIG. 1A is a perspective overall view of a flavor inhalation device according to one embodiment of the embodiment.
Figure 1B:
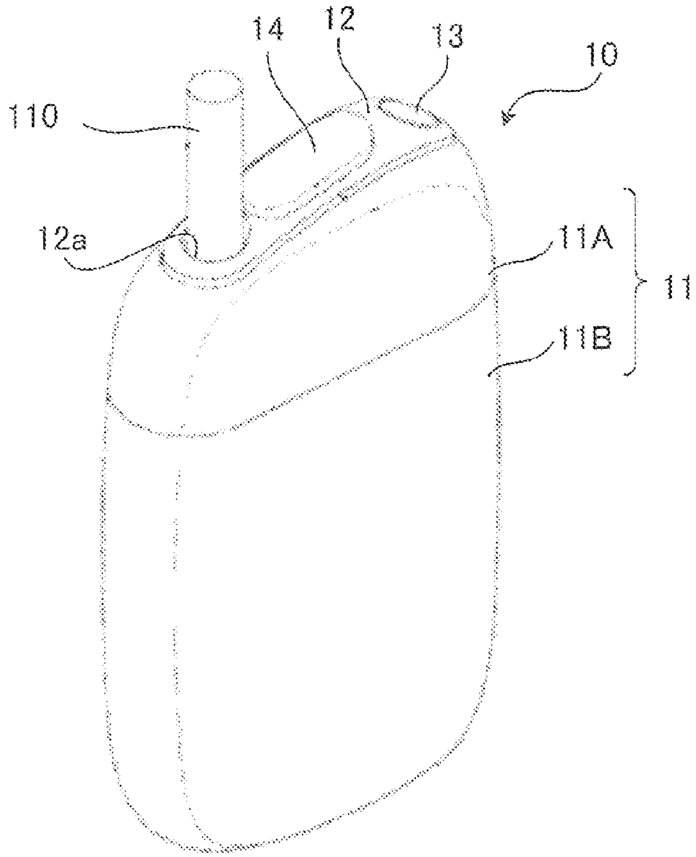
FIG. 1B is a perspective overall view of the flavor inhalation device according to the embodiment which holds a smoking article.

FIG. 1A is a perspective overall view of a flavor inhalation device according to one embodiment of the embodiment. FIG. 1B is a perspective overall view of the flavor inhalation device according to the embodiment which holds a smoking article. A flavor inhalation device 10 according to the present embodiment is configured to generate aerosol containing a flavor, for example, by heating a smoking article 110 having a flavor source that includes an aerosol source.

As illustrated in FIGS. 1A and 1B, the flavor inhalation device 10 includes a top housing 11A, a bottom housing 11B, a cover 12, a switch 13, and a lid portion 14. The top housing 11A and the bottom housing 11B are connected together to form an outer housing 11 (second housing) located on an outermost side of the flavor inhalation device 10. The outer housing 11 is of such a size as to fit in a user's hand. When using the flavor inhalation device 10, the user can hold the flavor inhalation device 10 in his/her hand and inhale the flavor.

The top housing 11A has an opening, not shown. The cover 12 is coupled to the top housing 11A to close the opening. As illustrated in FIG. 1B, the cover 12 has an opening 12*a* into which the smoking article 110 can be inserted. The lid portion 14 is configured to open/close the opening 12*a* of the cover 12. To be specific, the lid portion 14 is attached to the cover 12 and configured to be movable between a first position for closing the opening 12*a* and a second position for opening the opening 12*a* along a surface of the cover 12. The lid portion 14 thus can allow or restrict access of the smoking article 110 to the inside of the flavor inhalation device 10.

The switch 13 is used to switch on and off the activation of the flavor inhalation device 10. For example, if the user operates the switch 13 with the smoking article 110 inserted in the opening 12*a* as illustrated in FIG. 1B, electric power is supplied from a power source, not shown, to a heating member, not shown, which makes it possible to heat the smoking article 110 without burning the smoking article 110. The heating of the smoking article 110 causes aerosol to evaporate from the aerosol source included in the smoking article 110, and the flavor of the flavor source is taken into the aerosol. The user can inhale the aerosol containing the flavor by sucking a portion (which is illustrated in FIG. 1B) of the smoking article 110 which protrudes from the flavor inhalation device 10. In the present specification, a longitudinal direction of the flavor inhalation device 10 is a direction in which the smoking article 110 is inserted in the opening 12*a*.

Figure 2:
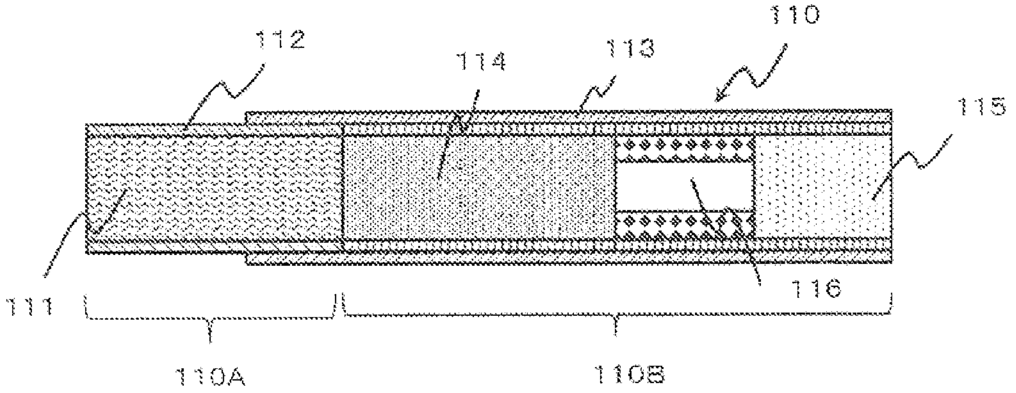
FIG. 2 is a cross-sectional view of a smoking article.

The following discussion explains a configuration of the smoking article 110 used in the flavor inhalation device 10 according to the present embodiment. FIG. 2 is a cross-sectional view of the smoking article 110. According to an embodiment shown in FIG. 2, the smoking article 110 includes a base material portion 110A including filling 111 and first wrapping paper 112 that wraps the filling 111, and a mouthpiece portion 110B that forms an opposite end portion from the base material portion 110A. The base material portion 110A and the mouthpiece portion 110B are joined together using second wrapping paper 113 that is separate from the first wrapping paper 112. It is possible, however, to use the first wrapping paper 112, instead of the second wrapping paper 113, to join the base material portion 110A and the mouthpiece portion 110B.

The mouthpiece 110B in FIG. 2 includes a paper tube portion 114, a filter portion 115, and a hollow segment portion 116 disposed between the paper tube portion 114 and the filter portion 115. The hollow segment portion 116 comprises, for example, a filling layer including one or more hollow channels, and a plug wrapper that covers the filling layer. The filling layer has a high fiber filling density. During inhalation, therefore, air and aerosol flow only through the hollow channel and hardly flow in the filling layer. If it is desired to repress a decrease in aerosol component which is caused by filtration of the filter portion 115 in the smoking article 110, the filter portion 115 is reduced in length, and the reduced amount is replaced with the hollow segment portion 116, which is effective to increase a delivery amount of the aerosol.

The mouthpiece portion 110B in FIG. 2 comprises three segments. According to the present embodiment, however, the mouthpiece portion 110B may comprise one or two segments or may comprise four or more segments. For example, it is possible to omit the hollow segment portion 116 and arrange the paper tube portion 114 and the filter portion 115 adjacently to each other to form the mouthpiece portion 110B.

According to the embodiment illustrated in FIG. 2, the smoking article 110 preferably has a longitudinal length ranging from 40 mm to 90 mm, more preferably from 50 mm to 75 mm, and still more preferably from 50 mm to 60 mm. The smoking article 110 preferably has a circumference ranging from 15 mm to 25 mm, more preferably from 17 mm to 24 mm, and still more preferably 20 mm to 23 mm. The smoking article 110 may include the base material portion 110A having a length of 20 mm, the first wrapping paper 112 having a length of 20 mm, the hollow segment portion 116 having a length of 8 mm, and the filter portion 115 having a length of 7 mm. However, the length of each of the aforementioned segments may be properly changed according to manufacturing suitability, quality requirement, and the like.

According to the present embodiment, the filling 111 of the smoking article 110 may contain an aerosol source that is heated at predetermined temperature and generates aerosol. The aerosol source may be of any kind. Materials extracted from various natural products and/or constituents thereof may be selected depending on an intended use. Examples of the aerosol source include glycerin, propylene glycol, triacetin, 1,3-butanediol, and composites thereof. Contained amount of the aerosol source in the filling 111 is not particularly limited as long as the aerosol source sufficiently generates aerosol. From a perspective of provision of a good smoking flavor, the contained amount of the aerosol source is generally 5% by weight or more, preferably 10% by weight or more, and generally 50% by weight or less, preferably 20% by weight or less.

The filling 111 of the smoking article 110 according to the present embodiment may contain shred tobacco as a flavor source. The shred tobacco may be made of any material, and publicly-known materials including laminae and stems may be used. If the smoking article 110 is 22 mm in circumference and 20 mm in length, the contained amount of the filling 111 in the smoking article 110 ranges, for example, from 200 mg to 400 mg, preferably from 250 mg to 320 mg. The filling 111 has a moisture content, for example, ranging from 8% by weight to 18% by weight, preferably from 10% by weight to 16% by weight. The foregoing moisture content prevents a stain on wrapping paper and improves a winding suitability in manufacture of the base material portion 110A. There is no particular limitation in size and preparation method of the shred tobacco used as the filling 111. For example, dried tobacco leaves may be used, which are shredded into pieces each having a width ranging from 0.8 mm to 1.2 mm. It is also possible to use dried tobacco leaves that are pulverized to have an average particle diameter ranging from about 20 μm to about 200 μm to be uniformed, processed into a sheet, and shredded into pieces each having a width ranging from 0.8 mm to 1.2 mm. The leaves processed into a sheet may be gathered, instead of being shredded, to be used as the filling 111. The filling 111 may contain one or more aroma chemicals. The aroma chemicals may be of any kind. From a perspective of provision of a good smoking flavor, however, menthol is preferable.

According to the present embodiment, the first wrapping paper 112 and the second wrapping paper 113 of the smoking article 110 can be made of base paper having a basis weight ranging, for example, from 20 gsm to 65 gsm, preferably from 25 gsm to 45 gsm. The first wrapping paper 112 and the second wrapping paper 113 are not particularly limited in thickness. From a perspective of rigidity, air permeability, and ease of preparation in paper manufacturing, however, the first wrapping paper 112 and the second wrapping paper 113 have a thickness ranging from 10 μm to 100 μm, preferably from 20 μm to 75 μm, and more preferably from 30 μm to 50 μm.

According to the present embodiment, the first wrapping paper 112 and the second wrapping paper 113 of the smoking article 110 may contain loading material. Contained amount of the loading material may fall in a range from 10% by weight to 60% by weight relative to total weight of the first wrapping paper 112 and the second wrapping paper 113, and preferably from 15% by weight to 45% by weight. According to the present embodiment, the contained amount of the loading material preferably ranges from 15% by weight to 45% by weight relative to the preferable basis weight range (from 25 gsm to 45 gsm). As the loading material, for example, calcium carbonate, titanium dioxide, kaolin or the like may be used. Paper containing such loading materials provides white light color that is preferable from a perspective of external appearance of wrapping paper of the smoking article 110, and can maintain whiteness on a permanent basis. If the wrapping paper contains a large amount of such loading materials, for example, whiteness percentage of the wrapping paper in conformity with the ISO International Standards can be maintained at 83% or more. Considering a utilitarian purpose of the first wrapping paper 112 and the second wrapping paper 113 as wrapping paper for the smoking article 110, the first wrapping paper 112 and the second wrapping paper 113 preferably have a tensile strength of 8 N/15 mm or higher. The tensile strength can be increased by reducing the contained amount of the loading material. More specifically, the tensile strength can be increased by reducing the contained amount of the loading material less than the upper limit of the contained amount of the loading material with respect to each of the basis weight ranges mentioned above.

Figure 3:
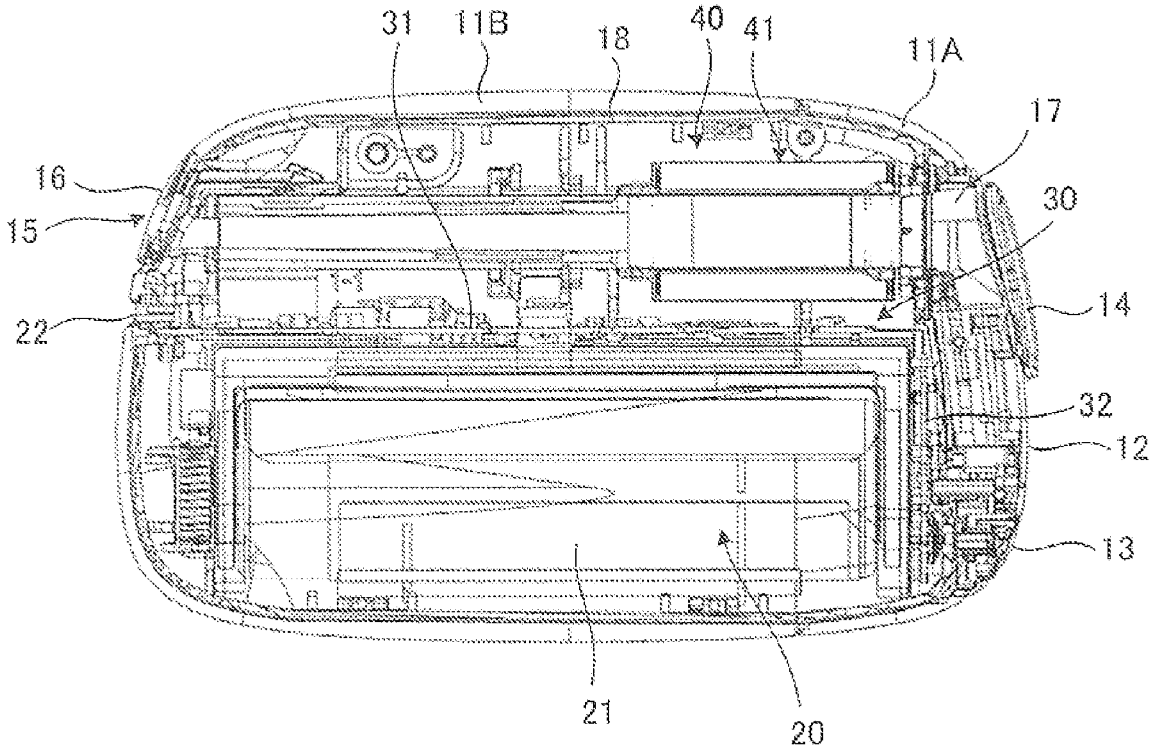
FIG. 3 is a cross-sectional view as viewed in a direction of arrow 3-3 shown in FIG. 1A.

The following discussion explains an internal structure of the flavor inhalation device 10 illustrated in FIGS. 1A and 1B. FIG. 3 is a cross-sectional view as viewed in a direction of arrow 3-3 shown in FIG. 1A. As illustrated in FIG. 3, the flavor inhalation device 10 includes a power source portion 20, a circuit portion 30, and a heating portion 40 in an interior space of the outer housing 11 and an inner housing 18 (first housing). The outer housing 11 and the inner housing 18 will be explained later. The circuit portion 30 includes a first circuit board 31 and a second circuit board 32 that is electrically connected to the first circuit board 31. The first circuit board 31 is disposed, for example, so as to extend in the longitudinal direction as illustrated in the figure. The power source portion 20 and the heating portion 40 are thus separated by the first circuit board 31. This represses transmission of the heat generated in the heating portion 40 to the power source portion 20.

The second circuit board 32 is disposed between the top housing 11A and the power source portion 20 and extends in a direction orthogonal to the extending direction of the first circuit board 31. The switch 13 is disposed adjacently to the second circuit board 32. When the user presses down the switch 13, the switch 13 can partially contact the second circuit board 32.

The first circuit board 31 and the second circuit board 32 include, for example, a microprocessor or the like and are capable of controlling power supply from the power source portion 20 to the heating portion 40. This allows the first circuit board 31 and the second circuit board 32 to control the heating of the smoking article 110 which is carried out by the heating portion 40.

The power source portion 20 includes a power source 21 that is electrically connected to the first circuit board 31 and the second circuit board 32. The power source 21 may be, for example, a rechargeable or non-rechargeable battery. The power source 21 is electrically connected to the heating portion 40 through at least either one of the first circuit board 31 and the second circuit board 32. This allows the power source 21 to supply power to the heating portion 40 so as to properly heat the smoking article 110. As illustrated in the figure, the power source 21 is disposed adjacently in a direction orthogonal to the longitudinal direction of the heating portion 40. This makes it possible to repress an increase of the longitudinal length of the flavor inhalation device 10 even if the power source 21 is increased in size.

The flavor inhalation device 10 further includes a terminal 22 that is connectable to an external power source. The terminal 22 may be connected, for example, to a cable of a micro USB or the like. If the power source 21 is a rechargeable battery, the power source 21 can be charged by connecting the external power source to the terminal 22 to apply current from the external power source to the power source 21. It is also possible to connect a data transmission cable of a micro USB or the like to the terminal 22 so that data associated to activation of the flavor inhalation device 10 may be sent to an external device.

The heating portion 40 includes a heating assembly 41 extending in the longitudinal direction as illustrated in the figure. The heating assembly 41 comprises a plurality of cylindrical members and forms a cylindrical body as a whole. The heating assembly 41 is configured to be capable of accommodating part of the smoking article 110 inside. The heating assembly 41 has a function of defining a channel for air to be supplied to the smoking article 110 and a function of heating the smoking article 110 from an outer periphery thereof.

The bottom housing 11B is provided with a vent hole 15 that allows air to enter the heating assembly 41. More specifically, the vent hole 15 is in fluid communication with one end portion (end portion on the left side in FIG. 3) of the heating assembly 41. The flavor inhalation device 10 includes an attachable/detachable cap 16 at the vent hole 15. The cap 16 is configured to, even in a position attached to the vent hole 15, allow air to enter the heating assembly 41 though the vent hole 15. The cap 16 may include, for example, a through hole, a notch or the like, not shown. Since the cap 16 is attached to the vent hole 15, a substance produced from the smoking article 110 inserted in the heating assembly 41 is prevented from falling outside the outer housing 11 through the vent hole 15.

The other end portion (end portion on the right side in FIG. 3) of the heating assembly 41 is in fluid communication with the opening 12*a* illustrated in FIG. 1B. A substantially cylindrical outer fin 17 is provided between the cover 12 with the opening 12*a* and the other end portion of the heating assembly 41. When the smoking article 110 is inserted from the opening 12*a* of the cover 12 into the flavor inhalation device 10 as illustrated in FIG. 1B, the smoking article 110 passes through the outer fin 17 to be partially disposed inside the heating assembly 41. For this reason, the outer fin 17 is preferably formed so that an opening located close to the cover 12 is larger than an opening located close to the other end portion of the heating assembly 41. This facilitates the insertion of the smoking article 110 from the opening 12*a* into the outer fin 17. When the smoking article 110 is not inserted inside the heating assembly 41, the user can clean the inside of the heating assembly 41 by inserting a tool such as a brush from the opening 12*a* into the heating assembly 41. The cleaning tool can be inserted from the one end portion (end portion on the left side in FIG. 3) of the heating assembly 41. In such a case, the cap is removed from the vent hole 15 of the flavor inhalation device 10.

If the user inhales from a portion of the smoking article 110 which protrudes from the flavor inhalation device 10, that is, the filter portion 115 illustrated in FIG. 2, with the smoking article 110 inserted from the opening 12*a* in the flavor inhalation device 10 as illustrated in FIG. 1B, air enters from the vent hole 15 into the heating assembly 41. After entering in the heating assembly 41, the air passes through the heating assembly 41 and reaches into the user's mouth together with the aerosol generated from the smoking article 110. Accordingly, an end of the heating assembly 41 which is close to the vent hole 15 is an upstream side, whereas an end of the heating assembly 41 which is close to the opening 12*a* (an end close to the outer fin 17) is a downstream side.

Figure 4:
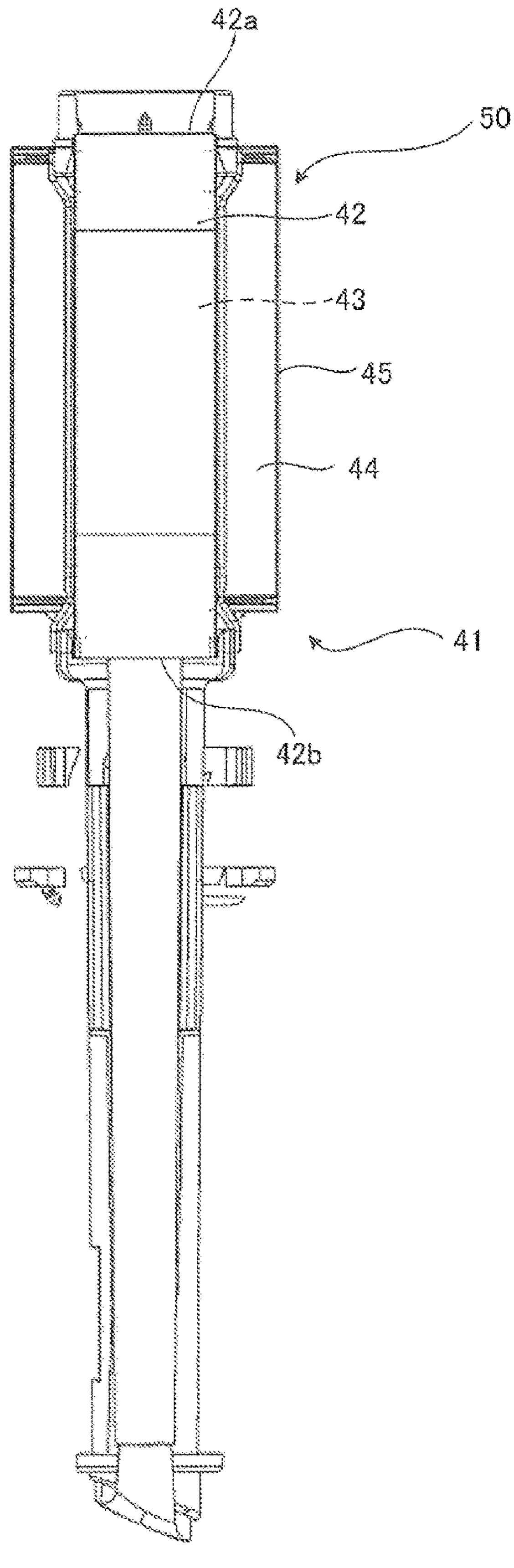
FIG. 4 is a cross-sectional view of a heating assembly.

A configuration of the heating assembly 41 illustrated in FIG. 3 will be now discussed. FIG. 4 is a cross-sectional view of the heating assembly 41. The discussion focuses on a configuration of a heat generating element 50 of the heating assembly 41 which heats the smoking article 110 from the outer periphery thereof. The heat generating element 50 includes an inner tube 42, a heating member 43, aerogel 44 (which is an example of heat insulating material), and an outer tube 45. The inner tube 42 is provided with a first opening 42*a* at one end in which the smoking article 110 can be inserted, and further provided with a second opening 42*b* at the other end which forms an air inlet. The inner tube 42 is configured to be capable of accommodating the smoking article 110. According to the present embodiment, the inner tube 42 has a columnar shape and is configured to come into contact with at least a part of the smoking article 110 inserted from the first opening 42*a*. The second opening 42*b* is located upstream of an air flow, and the first opening 42*a* is located downstream of the air flow.

The outer tube 45 is so disposed as to enclose the inner tube 42, which forms a predetermined cylindrical space between the inner tube 42 and the outer tube 45. The heating member 43 may be a flexible film heater that is fabricated, for example, by sandwiching a heat-generating resistive element with two PI (polyimide) films or other like films. The heating member 43 is so disposed as to abut against the inner tube 42. To be more specific, in an example illustrated in the figure, the heating member 43 is disposed on an outer peripheral surface of the inner tube 42, and an inner surface of the heating member 43 contacts an outer surface of the inner tube 42. Since the heating member 43 is disposed along the outer peripheral surface of the inner tube 42, the heating member 43 is deformed into a substantially cylindrical shape as a whole.

The aerogel 44 is disposed in the cylindrical space formed between the inner tube 42 and the outer tube 45. Since the aerogel 44 is disposed between the inner tube 42 and the outer tube 45, the heat generated from the heating member 43 is not easily transmitted to the outer tube 45. According to the present embodiment, the aerogel 44 is employed to insulate the heat generated from the heating member 43. Instead of the aerogel 44, another heat insulating material may be utilized. It is also possible to vacuumize the cylindrical space formed between the inner tube 42 and the outer tube 45 to make a vacuum heat insulating space.

Figure 5:
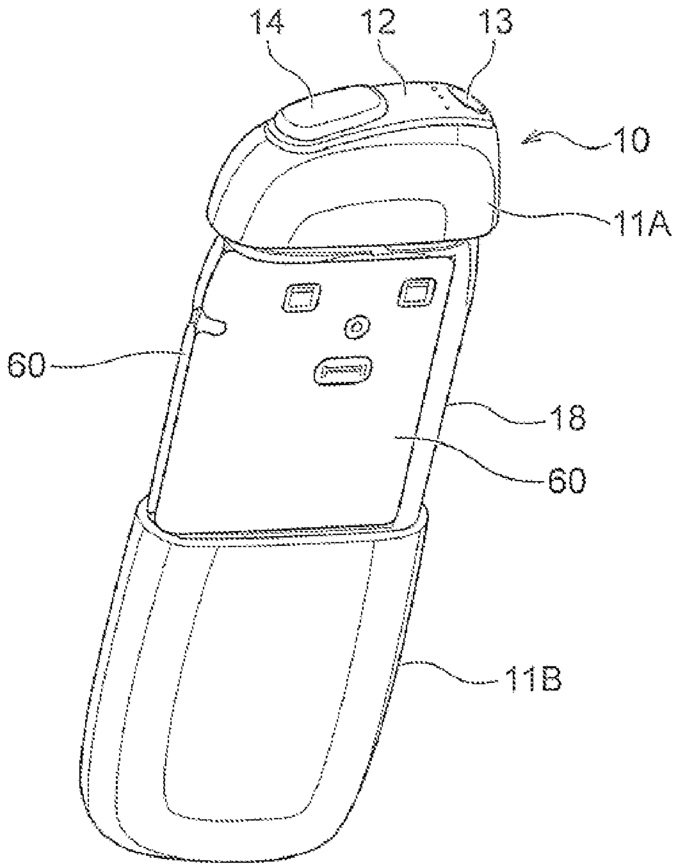
FIG. 5 is an exploded perspective view of a flavor inhalation device with an outer housing removed.
Figure 6:
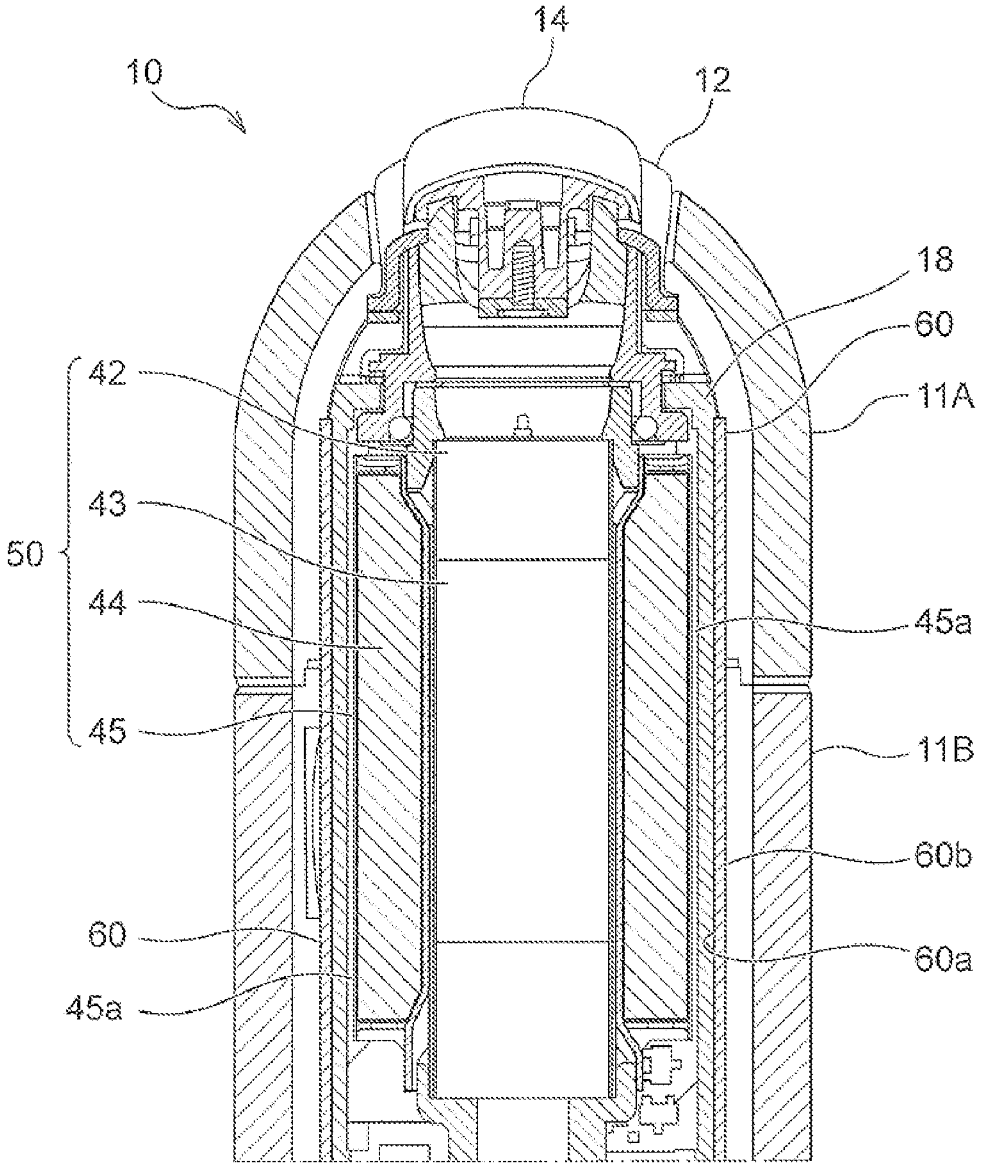
FIG. 6 is a cross-sectional view of the flavor inhalation device.

The following discussion explains configurations the outer housing 11 and the inner housing 18 illustrated in FIG. 3. FIG. 5 is an exploded perspective view of the flavor inhalation device 10 with the outer housing 11 removed. FIG. 6 is a cross-sectional view of the flavor inhalation device 10. In FIGS. 5 and 6, the inner housing 18 accommodates in an interior space thereof the power source portion 20, the circuit portion 30, and the heating portion 40 illustrated in FIG. 3. In other words, the inner housing 18 accommodates the heat generating element 50 of the heating assembly 41 which heats the smoking article 110 from the outer periphery thereof. The top housing 11A and the bottom housing 11B forming the outer housing 11 enclose the inner housing 18 and accommodate the inner housing 18 in an interior space thereof. A heat diffusion sheet 60 (which is an example of a heat diffusion member) is provided between the inner housing 18 and the outer housing 11. According to the present embodiment, the heat diffusion sheet 60 is provided on a face side (front-side surface in FIG. 5) and a reverse side (rear-side surface in FIG. 5) of the inner housing 18.

Figure 7:
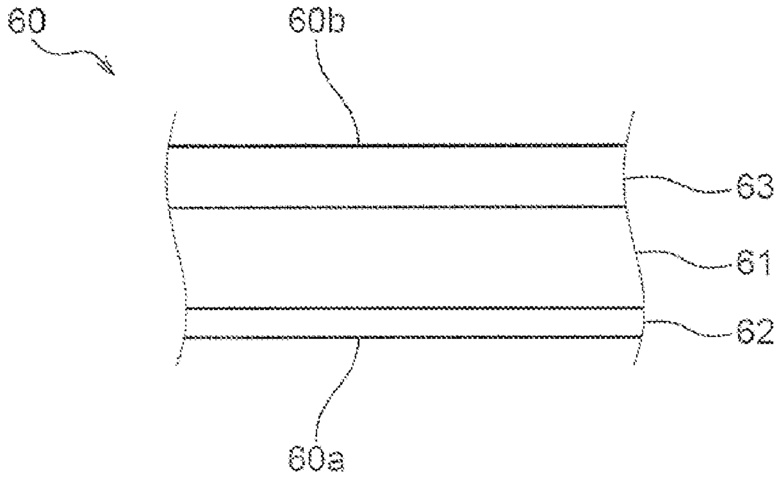
FIG. 7 is a side view of a heat diffusion sheet.

The inner housing 18 and the outer housing 11 are made of resin, for example, and may be fabricated specifically from polycarbonate (PC), ABS (Acrylonitrile-Butadiene-Styrene) resin, polymer alloy containing a plurality of kinds of polymers or the like. The inner housing 18 and the outer housing 11 may be made of the same material or different materials having different heat conductivities. If the inner housing 18 and/or the outer housing 11 is formed of a plurality of components, the components may be made of the same material or made of different materials having different heat conductivities. The heat diffusion sheet 60 is made, for example, of graphite. The following discussion explains a structure of the heat diffusion sheet 60 with reference to FIG. 7. FIG. 7 is a side view of the heat diffusion sheet 60. In FIG. 7, the heat diffusion sheet 60 includes a first face 60*a* in contact with an outer surface of the inner housing 18 and a second face 60*b* facing an opposite side from the first face 60*a*. The heat diffusion sheet 60 includes a graphite layer 61 made of graphite material, double-sided adhesive paper 62 that is attached to one side of the graphite layer 61 to form the first face 60*a*, and one-sided tape 63 that is attached to the other side of the graphite layer 61 to form the second face 60*b*. The heat diffusion sheet 60 has a thickness of about 0.2 mm that is total thickness of the graphite layer 61, for example, having a thickness of 180 micrometers which is formed by laminating three graphite material layers each having a thickness of 60 micrometers, the double-sided adhesive paper 62, and the one-sided tape 63. The one-sided tape 63 functions as a protecting member that protects a surface of the graphite layer 61 which is located on the side where the second face 60*b* is. The heat diffusion sheet 60 does not necessarily have to have the foregoing structure. The graphite layer 61 may include two or less layers or four or more layers. Instead of using the double-sided adhesive paper 62 and/or the one-sided tape 63, it is possible to use other publicly-known things which have equivalent functions.

Heat conductivity of the inner housing 18 or the outer housing 11 under a situation where ambient temperature is 20° C. ranges, for example, from 0.1 W/mK to 0.8 W/mK, preferably 0.1 W/mK to 0.4 W/mK, and is typically 0.2 W/mK. Heat conductivity of the heat diffusion sheet 60 made of graphite under a situation where ambient temperature is 20° C. ranges, for example, from 700 W/mK to 2000 W/mK, preferably 1100 W/mK to 1500 W/mK, and is typically 1300 W/mK. RB/RA is a ratio of heat conductivity RB of the heat diffusion sheet 60 to heat conductivity RA that is either the heat conductivity of the inner housing 18 or the heat conductivity of the outer housing 11, whichever is higher. RB/RA falls in a range from 875 to 20000, preferably from 2750 to 15000, and is typically 6500. The heat conductivities of the inner housing 18, the outer housing 11, and the heat diffusion sheet 60 are not limited to the foregoing as long as the heat conductivity of the heat diffusion sheet 60 is higher than the heat conductivities of the inner housing 18 and the outer housing 11. The heat diffusion sheet 60 does not necessarily have to be made of graphite and may be made of metal, such as aluminum and copper.

The heat diffusion sheet 60 is so configured that T1-T2 that is temperature difference between highest temperature T1 of an outer surface of the heat generating element 50 and highest temperature T2 of an outer surface of the outer housing 11 ranges, for example, from 17° C. to 27° C. The heat diffusion sheet 60 is disposed at such a position with respect to the heat generating element 50 and the outer housing 11 that the highest temperature T2 of the outer surface of the outer housing 11 falls in a range, for example, from 43° C. to 53° C., and is typically 48° C. Performance of the heat diffusion sheet 60 is not limited to the foregoing.

Referring to FIGS. 5 and 6 again, the first face 60*a* of the heat diffusion sheet 60 is in contact with the outer surface of the inner housing 18, and the second face 60*b* of the heat diffusion sheet 60 is away from an inner surface of the outer housing 11. Specifically, in a region where the heat diffusion sheet 60 is provided between the inner housing 18 and the outer housing 11, for example, an air layer is formed between the second face 60*b* of the heat diffusion sheet 60 and the inner surface of the outer housing 11. This air layer is not essential, and the second face 60*b* of the heat diffusion sheet 60 may be in contact with the inner surface of the outer housing 11. The heat diffusion sheet 60 covers the entire length of the heat generating element 50 and expands over a longer area than the entire length of the heat generating element 50 when the heat generating element 50 is viewed along the longitudinal direction thereof, that is, along the longitudinal direction of the flavor inhalation device 10. In a region where the heat diffusion sheet 60 is not provided between the inner housing 18 and the outer housing 11, the outer surface of the inner housing 18 and the inner surface of the outer housing 11 are in contact with each other. The outer tube 45 includes a contact region 45*a* on an outer peripheral surface thereof. The contact region 45*a* extends along the longitudinal direction of the heat generating element 50 and is in contact with an inner surface of the inner housing 18. The heat diffusion sheet 60 extends across the contact region 45*a* in a direction orthogonal to the longitudinal direction of the heat generating element 50.

Figure 8:
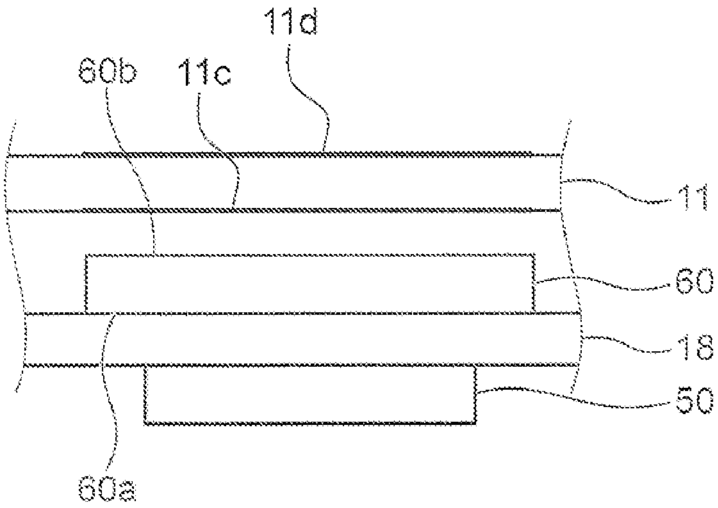
FIG. 8 is a schematic side view showing relationship of a heat generating element, an inner housing, the heat diffusion sheet, and the outer housing.

Positional relationship of the heat generating element 50, the inner housing 18, the heat diffusion sheet 60, and the outer housing 11 will be now discussed with reference to FIG. 8. FIG. 8 is a side view schematically showing relationship of the heat generating element 50, the inner housing 18, the heat diffusion sheet 60, and the outer housing 11. In FIG. 8, a space, such as an air layer, is formed between the second face 60*b* of the heat diffusion sheet 60 and the inner surface of the outer housing 11. The heat diffusion sheet 60 is provided over a longer area than longitudinal length of the heat generating element 50. The inner surface of the outer housing 11 includes a partial region 11*c* facing the heat diffusion sheet 60. A region 11*d* of the outer surface of the outer housing 11 which coincides with the partial region 11*c* is so configured as to be held by the user's hand.

Figure 9:
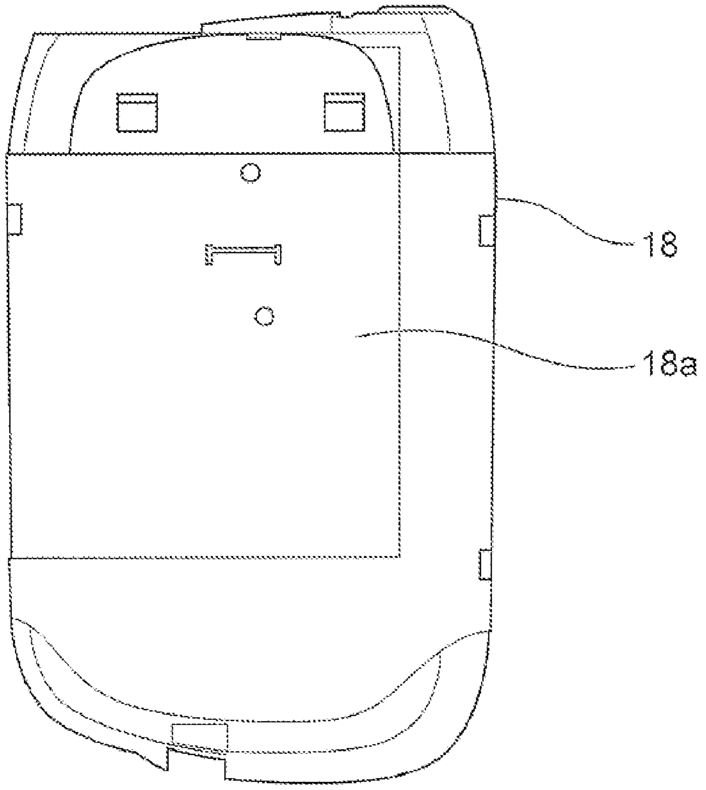
FIG. 9 is a side view of the inner housing.
Figure 10:
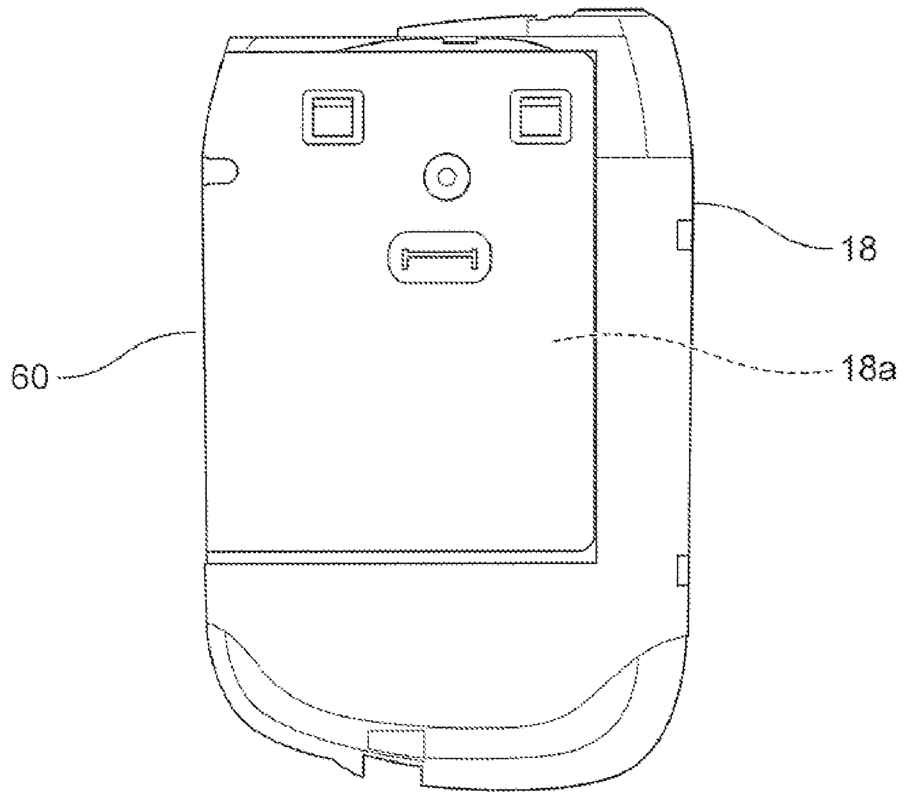
FIG. 10 is a side view of the inner housing provided with the heat diffusion sheet.

The following discussion explains relationship of the inner housing 18 and the heat diffusion sheet 60 with reference to FIGS. 9 and 10. FIG. 9 is a side view of the inner housing 18. FIG. 10 is a side view of the inner housing 18 provided with the heat diffusion sheet 60. In FIGS. 9 and 10, a recessed portion 18*a* for providing the heat diffusion sheet 60 is formed in the outer surface of the inner housing 18. The recessed portion 18*a* has depth equal to or larger than the thickness of the heat diffusion sheet 60. Specifically, the recessed portion 18*a* is configured to have such a depth that t/d which is a ratio of thickness t of the heat diffusion sheet 60 to depth d of the recessed portion 18*a* ranges from 0.9 to 1.0. In short, the recessed portion 18*a* is so designed that the heat diffusion sheet 60 does not protrude from the recessed portion 18*a*. A similar recessed portion is also formed in an opposite surface of the inner housing 18 illustrated in FIGS. 9 and 10. The recessed portion does not necessarily have to be formed in the inner housing 18 and may be formed in the inner surface of the outer housing 11 or in both the inner housing 18 and the outer housing 11.

The flavor inhalation device 10 thus configured comprises the heat generating element 50, the inner housing 18 that accommodates the heat generating element 50, the outer housing 11 that accommodates the inner housing 18, and the heat diffusion sheet 60 provided in at least a part of space between the inner housing 18 and the outer housing 11 and having a higher heat conductivity than the inner housing 18 and the outer housing 11. This makes it possible to use the heat diffusion sheet 60 to diffuse the heat generated from the heat generating element 50 and thus prevent the housing from becoming locally hot. Since the flavor inhalation device 10 has a double structure that includes the inner housing 18 and the outer housing 11, the flavor inhalation device 10 is improved in waterproof performance. If the flavor inhalation device 10 has a single housing, a fixation structure of inner parts and exterior parts are integrally formed, which increases constraints on design of the flavor inhalation device 10. The double structure, however, solves the constraints on the design.

The heat diffusion sheet 60 includes the first face 60*a* that is in contact with the outer surface of the inner housing 18 and the second face 60*b* that faces the opposite side from the first face 60*a*. The second face 60*b* is away from the inner surface of the outer housing 11. The heat diffusion sheet 60 is provided to the inner housing 18, and the air layer is formed between the second face 60*b* of the heat diffusion sheet 60 and the inner surface of the outer housing 11. This makes it possible to efficiently diffuse the heat generated from the heat generating element 50 using the heat diffusion sheet 60 and further prevent the housing from becoming locally hot. To be more specific, amount of heat transfer inside the heat diffusion sheet 60 is proportional to temperature gradient by Fourier's law. Therefore, if the heat diffusion sheet 60 is placed in the inner housing 18 that is located closer to the heat generating element 50, the temperature gradient between a high-temperature portion (portion that is great in temperature rise caused by a heat source) and a low-temperature portion (portion that is small in temperature rise) is increased, which increases the amount of heat transfer. Furthermore, since the air layer is provided, which functions as a heat insulating portion, the temperature of the outer housing 11 can be decreased overall. In other words, since the inner housing 18, the heat diffusion sheet 60, the air layer, and the outer housing 11 are arranged in the order named, it is possible to materialize both high heat diffusion effect and high heat insulation effect. Unlike the above-described configuration, if the heat diffusion sheet 60 is placed in the outer housing 11, and the inner housing 18, the air layer, the heat diffusion sheet 60, and the outer housing 11 are arranged in the order named, the temperature gradient of the heat diffusion sheet 60 becomes relatively small due to the heat insulation effect of the air layer, so that the heat diffusion effect becomes relatively small. Also, if the heat diffusion sheet 60 is placed in the outer housing 11, since the outer housing 11 is divided into the top housing 11A and the bottom housing 11B, the heat diffusion sheet 60 is also divided. That is, if the heat diffusion sheet 60 is placed in the same area in the outer housing 11 as in the case where the heat diffusion sheet 60 is placed in the inner housing 18, the heat diffusion sheet 60 has to be divided into the top housing 11A side and the bottom housing 11B side. If the heat diffusion sheet 60 is placed in the inner housing 18, the heat diffusion sheet 60 can be placed in large area without being divided.

The heat generating element 50 has a columnar shape. The heat diffusion sheet 60 covers the entire length of the heat generating element 50 and expands over a longer area than the entire length of the heat generating element 50 when the heat generating element 50 is viewed along the longitudinal direction thereof. The outer tube 45 includes the contact region 45*a* in an outer peripheral surface thereof. The contact region 45*a* extends along the longitudinal direction of the heat generating element 50 and is in contact with the inner surface of the inner housing 18. The heat diffusion sheet 60 extends across the contact region 45*a* in the direction orthogonal to the longitudinal direction of the heat generating element 50. Since the heat diffusion sheet 60 covers the heat generating element 50, the heat generated from the heat generating element 50 can be efficiently diffused by the heat diffusion sheet 60, and the housing can be prevented from becoming locally hot.

In the region where the heat diffusion sheet 60 is not provided between the inner housing 18 and the outer housing 11, the outer surface of the inner housing 18 and the inner surface of the outer housing 11 are in contact with each other. The outer housing 11 then can be securely fixed to the inner housing 18.

The inner housing 18 and the outer housing 11 are made, for example, of resin. The heat diffusion sheet 60 is made, for example, of graphite. RB/RA that is a ratio of heat conductivity RB of the heat diffusion sheet 60 to heat conductivity RA that is either the heat conductivity of the inner housing 18 or the heat conductivity of the outer housing 11, whichever is higher, falls in a range from 875 to 20000, preferably from 2750 to 15000, and is typically 6500. The heat diffusion sheet 60 is so configured that T1-T2 that is temperature difference between highest temperature T1 of the outer surface of the heat generating element 50 and highest temperature T2 of the outer surface of the outer housing 11 ranges, for example, from 17° C. to 27° C. The heat diffusion sheet 60 is disposed at such a position with respect to the heat generating element 50 and the outer housing 11 that the highest temperature T2 of the outer surface of the outer housing 11 is in a range, for example, from 43° C. to 53° C. The heat generated from the heat generating element 50 then can be diffused by the heat diffusion sheet 60, which prevents the housing from becoming locally hot. More specifically, according to an experiment conducted by the inventors, under environment where ambient temperature was 25° C. when the heat generating element 50 had a surface temperature of about 70° C., a peak value of surface temperature of the outer housing 11 at a position 2.5 mm away from the surface of the heat generating element 50 became about 48° C. Without the heat diffusion sheet 60, the peak value of the surface temperature of the outer housing 11 at the position 2.5 mm away from the surface of the heat generating element 50 was about 60° C. In other words, it is possible to prevent the structure of the outer housing 11 from locally having high temperature. Even if the heat diffusion sheet 60 is an electrically conductive element, the board is prevented from short-circuit due to the structure in which the heat diffusion sheet 60 is sandwiched between the resin-made inner and outer housings 18 and 11.

The recessed portion 18*a* for providing the heat diffusion sheet 60 is formed in at least either the outer surface of the inner housing 18 or the inner surface of the outer housing 11. The recessed portion 18*a* has depth equal to or larger than the thickness of the heat diffusion sheet 60. Specifically, t/d which is the ratio of the thickness t of the heat diffusion member to the depth d of the recessed portion 18*a* ranges from 0.9 to 1.0. This makes it possible to use the heat diffusion sheet 60 to diffuse the heat generated from the heat generating element 50 to prevent the housing from locally having high temperature. Furthermore, the inner housing 18 or the outer housing 11 is prevented from increasing in thickness, which prevents the flavor inhalation device 10 from increasing in size. The embodiments according to the invention have been discussed. The invention, however, does not necessarily have to be made according to the above-described embodiments. The invention may be modified in various ways in a scope of the claims and the technical ideas discussed in the specification and drawings. Any shape and material that provide the operation and advantageous effects of the invention are in the scope of technical ideas of the invention even if there is no direct reference to such a shape and material in the specification and drawings.

Several embodiments disclosed in the present specification are described below.

According to a first embodiment, a housing is provided which comprises a first housing capable of accommodating a heat generating element, a second housing that encloses the first housing, and a heat diffusion member provided in at least a part of space between the first housing and the second housing and having a higher heat conductivity than the first housing and the second housing.

According to a second embodiment, in the housing of the first embodiment, the first housing and the second housing are made of resin.

According to a third embodiment, in the housing of the first or second embodiment, the heat diffusion member includes a first face in contact with an outer surface of the first housing and a second face facing an opposite side from the first face. The second face is away from an inner surface of the second housing.

According to a fourth embodiment, in the housing of any one of the first to third embodiments, in a region where the heat diffusion member is not provided between the first housing and the second housing, the outer surface of the first housing and the inner surface of the second housing are in contact with each other.

According to a fifth embodiment, in the housing of any one of the first to fourth embodiments, a recessed portion for providing the heat diffusion member is formed in at least either one of the outer surface of the first housing and the inner surface of the second housing.

According to a sixth embodiment, in the housing of the fifth embodiment, the recessed portion has depth equal to or larger than thickness of the heat diffusion member.

According to a seventh embodiment, in the housing of any one of the first to sixth embodiments, the heat generating element has a columnar shape, and the heat diffusion member covers an entire length of the heat generating element and expands over a longer area than the entire length of the heat generating member when the heat generating member is viewed along a longitudinal direction of the heat generating element.

According to an eighth embodiment, in the housing of any one of the first to seventh embodiments, the heat diffusion member is made of any one of graphite, aluminum, and copper.

According to a ninth embodiment, in the housing of the eighth embodiment, the heat diffusion member is made of graphite, and a protecting member is provided to a second housing-side surface of the heat diffusion member.

According to a 10th embodiment, in the housing of any one of the first to ninth embodiments, a ratio (RB/RA) of heat conductivity (RB) of the heat diffusion member to heat conductivity (RA) that is either one of heat conductivity of the first housing and heat conductivity of the second housing, whichever is higher, ranges from 2500 to 16000.

According to an 11th embodiment, in the housing of any one of the first to 10th embodiments, the heat diffusion member is so configured that temperature difference (T1−T2) between highest temperature (T1) of an outer surface of the heat generating element and highest temperature (T2) of an outer surface of the second housing ranges from 17° C. to 27° C.

According to a 12th embodiment, in the housing of any one of the first to 11th embodiments, the heat diffusion member is disposed at such a position with respect to the heat generating element and the second housing that the highest temperature (T2) of the outer surface of the second housing ranges from 43° C. to 53° C.

According to a 13th embodiment, a flavor inhalation device is provided which comprises the housing according to any one of the first to 12th embodiments.

According to a 14th embodiment, in the flavor inhalation device of the 13th embodiment, the heat generating element includes an inner tube that is capable of accommodating a columnar smoking article, a heating member that is disposed on an outer peripheral surface of the inner tube and heats the smoking article from outside in a radial direction, an outer tube that is disposed to enclose the inner tube and the heating member and forms an outer peripheral surface of the heat generating element, and heat insulating material disposed in a cylindrical space between the inner tube and the outer tube.

According to a 15th embodiment, in the housing of the 14th embodiment, the outer tube includes a contact region in an outer peripheral surface, the contact region extending along a longitudinal direction of the heat generating element and being in contact with the inner surface of the first housing. The heat diffusion member extends across the contact region in a direction orthogonal to the longitudinal direction of the heat generating element.

According to a 16th embodiment, in the flavor inhalation device of any one of the 13th to 15th embodiments, the inner surface of the second housing includes a partial region facing the heat diffusion member. A region of the outer surface of the second housing which coincides with the partial region is so configured as to be held by the user's hand.

REFERENCE SIGN LIST

10: Flavor inhalation device
11: Outer housing
18: Inner housing
42: Inner tube
43: Heating member
44: Aerogel
45: Outer tube
50: Heat generating element
60: Heat diffusion sheet
60*a*: First face
60*b*: Second face
61: Graphite layer
62: Double-sided adhesive paper
63: One-sided tape
11A: Top housing
11B: Bottom housing

The invention claimed is:

1. A housing comprising:
a first housing that is capable of accommodating a heat generating element;
a second housing that encloses the first housing; and
a heat diffusion member provided in at least a part of space between the first housing and the second housing and having a higher heat conductivity than the first housing and the second housing,
wherein the heat diffusion member includes an inner face in contact with an outer surface of the first housing and an outer face facing an opposite side from the inner face, the outer face spaced from an inner surface of the second housing.

2. The housing according to claim 1, wherein the first housing and the second housing are made of resin.

3. The housing according to claim 1, wherein, in a region where the heat diffusion member is not provided between the first housing and the second housing, the outer surface of the first housing and the inner surface of the second housing are in contact with each other.

4. The housing according to claim 1, wherein a recessed portion for providing the heat diffusion member is formed in at least either one of the outer surface of the first housing and the inner surface of the second housing.

5. The housing according to claim 4, wherein the recessed portion has depth equal to or larger than thickness of the heat diffusion member.

6. The housing according to claim 1, wherein the heat generating element has a columnar shape, and
wherein the heat diffusion member covers an entire length of the heat generating element and expands over a longer area than the entire length of the heat generating member when the heat generating member is viewed along a longitudinal direction of the heat generating element.

7. The housing according to claim 1, wherein the heat diffusion member is made of any one of graphite, aluminum, and copper.

8. The housing according to claim 7, wherein the heat diffusion member is made of graphite, and
wherein a protecting member is provided to a second housing-side surface of the heat diffusion member.

9. The housing according to claim 1, wherein a ratio (RB/RA) of heat conductivity (RB) of the heat diffusion member to heat conductivity (RA) that is either one of heat conductivity of the first housing and heat conductivity of the second housing, whichever is higher, ranges from 2750 to 20000.

10. The housing according to claim 1, wherein the heat diffusion member is so configured that temperature difference (T1−T2) between highest temperature (T1) of an outer surface of the heat generating element and highest temperature (T2) of an outer surface of the second housing ranges from 17° C. to 27° C.

11. The housing according to claim 1, wherein the heat diffusion member is disposed at such a position with respect to the heat generating element and the second housing that the highest temperature (T2) of the outer surface of the second housing ranges from 43° C. to 53° C.

12. A flavor inhalation device comprising the housing according to claim 1.

13. The flavor inhalation device according to claim 12, comprising:
a heat generating element,
the heat generating element including:
an inner tube that is capable of accommodating a columnar smoking article;
a heating member that is disposed on an outer peripheral surface of the inner tube and heats the smoking article from outside in a radial direction;
an outer tube that is disposed to enclose the inner tube and the heating member and forms an outer peripheral surface of the heat generating element, and
heat insulating material disposed in a cylindrical space between the inner tube and the outer tube.

14. The flavor inhalation device according to claim 13, wherein the outer tube includes a contact region in an outer peripheral surface, the contact region extending along a longitudinal direction of the heat generating element and being in contact with the inner surface of the first housing, and
wherein the heat diffusion member extends across the contact region in a direction orthogonal to the longitudinal direction of the heat generating element.

15. The flavor inhalation device according to claim 12, wherein the inner surface of the second housing includes a partial region facing the heat diffusion member, and wherein a region of the outer surface of the second housing which coincides with the partial region is so configured as to be held by a user's hand.

16. The housing according to claim 1, wherein a distance between the inner face and the outer face of the heat diffusion member is less than a distance between the outer surface of the first housing and the inner surface of the second housing where the heat diffusion member contacts the outer surface of the first housing.

* * * * *